Figure 1:
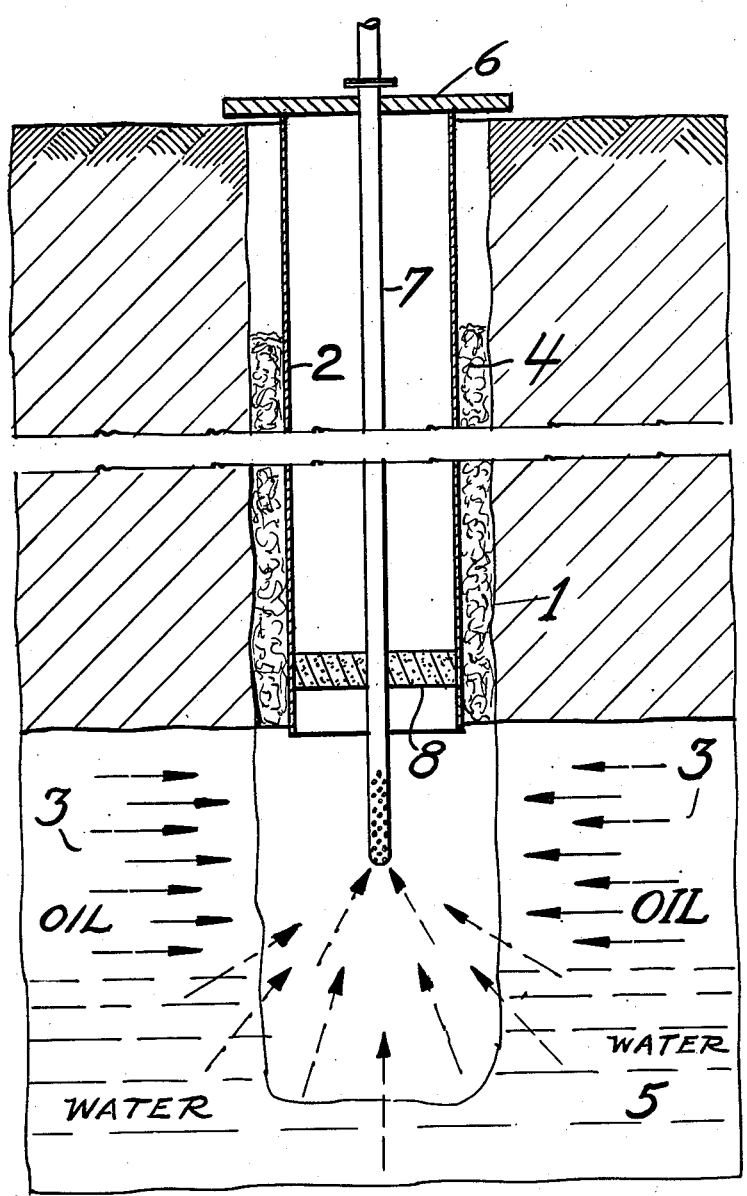

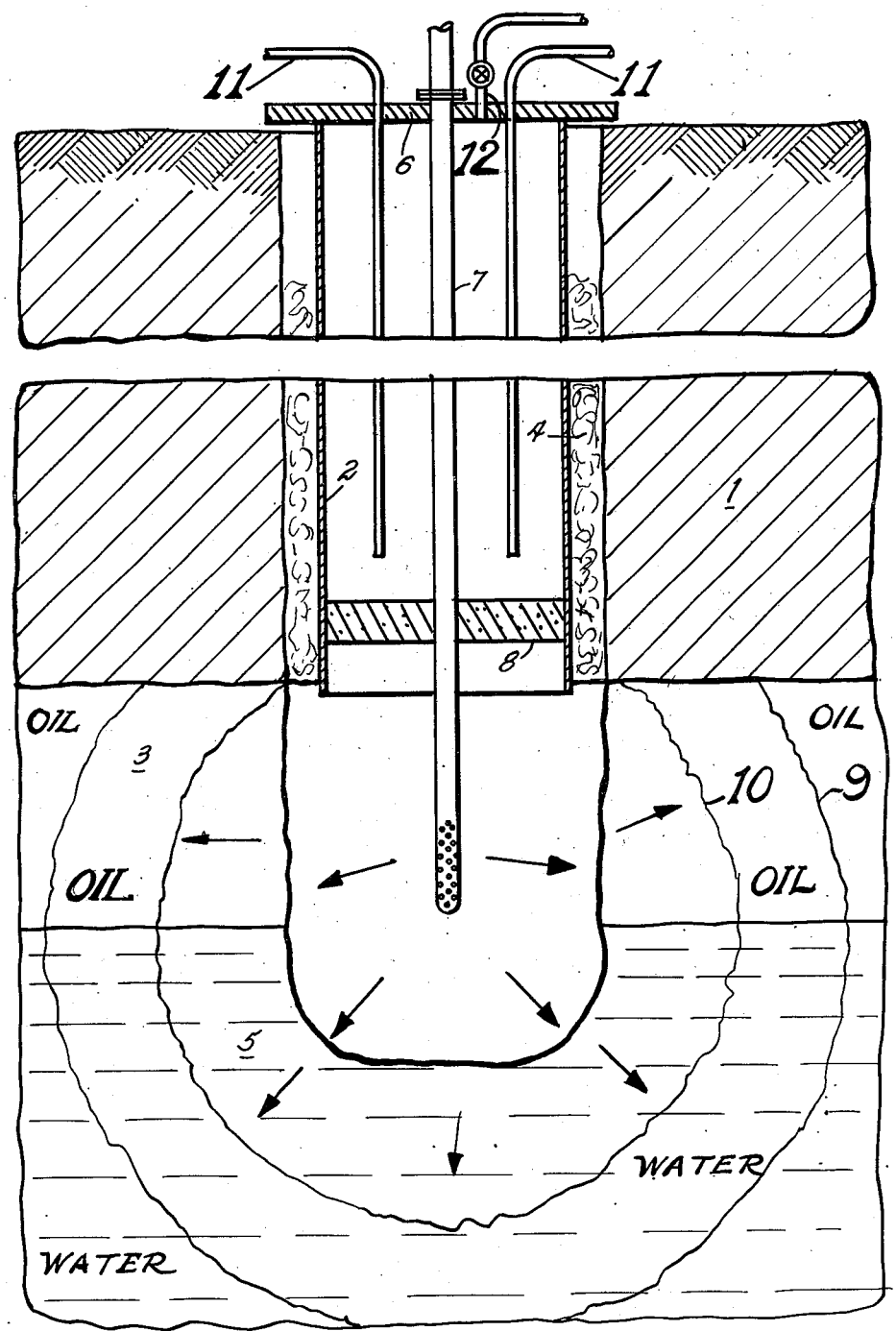
FIG.—2

Patented Oct. 21, 1952

2,614,635

UNITED STATES PATENT OFFICE 2,614,635

PREVENTING WATER ENCROACHMENT IN OIL WELLS

Philip S. Williams and Henry J. Welge, Tulsa, Okla., assignors to Standard Oil Development Company, a corporation of Delaware Application April 4, 1946, Serial No. 659,598

4 Claims. (Cl. 166—22)

The present invention is directed to a method for increasing the productivity of oil from a subterranean formation where the production of oil is impeded by water encroachment.

The interference with the production of oil from the subterranean formation by the simultaneous production of water has always been a paramount problem in the oil production industry. In most cases the producing formation contains salt water as well as oil so that the conventional well produces both simultaneously. It frequently happens that the ratio of the oil to the water decreases as production is continued because the grains of the producing formation become water-wet thereby offering resistance to the flow of oil while permitting unobstructed flow of water. This condition is aggravated by the fact that the sand grains ordinarily constituting the producing formation are wettable more readily by water than by oil.

In other cases there may be a water containing formation immediately below the oil containing formation. The water from the lower formation tends to come up into the bore hole to the producing string. This results in a condition known as coning which in its most aggravated stage results in a practically complete shut off of the oil from the producing string.

Various efforts have been made to cope with this situation. Temporary relief is afforded in certain cases by forcing a large volume of oil into the formations around the bore hole. This is calculated to wet the individual grains of the formation with oil and to postpone the time when they become water wet. One difficulty with this procedure is that, when it is resorted to, the grains may already be water wet with the result that the desideratum of rendering them oil wet is not readily achieved.

Another type of procedure which has been proposed is to first force through the formation surrounding the bore hole a liquid such as an alcohol capable of taking up water and to follow this with oil or with a substance which if deposited on the sand grains will have a tendency to render them preferentially oil wettable. The substances which have previously been proposed in this type of operation, however, are those which will at best form a physical coating on the sand grains. As a consequence, such coatings are subject to being washed off by the flow of fluid through the sand.

According to the present invention an improved result is achieved by treating the producing formation and, if desired, adjacent formations with substances which are capable of forming a chemical bond with the sand grains. Well known examples of such substances are the family of compounds known as silicones, which may also be described as polymeric organosilicon oxides or organosiloxanes in which chain linkages of silicon to oxygen exist. Their properties and preparation are described in the "Chemistry of the Silicones" by E. G. Rochow (John Wiley and Sons, Inc., New York, 1947). Typical silicones are the alkyl silicones such as methyl, ethyl and the like. Methyl silicone may be characterized by the formula—

$$CH_3[(CH_3)_2SiO]_xSi(CH_3)_3$$

in which $x$ has a value of from about 2 to about 10. The silicones employed should preferably be liquid, oil-soluble and substantially non-volatile at temperatures encountered in subterranean formations at depths usual in oil wells.

The formation may be treated with the silicone per se but this is not necessary for the production of the improved result. Considerable improvement is effected when a solution of a silicone in oil in concentration as low as 1% is employed as the treating agent.

The silicones form their most effective bond with siliceous material at elevated temperatures. The average oil well of a depth of say about 8500' will have a temperature in the neighborhood of 200° F. which is advantageous for the achievement of the desired result. If desired, additional heat may be imparted to the silicone to increase the bonding action between it and the siliceous material in the formation. This heat may be applied at the surface when a higher boiling silicone is employed. To conserve this heat the tubing through which the silicone is fed to the producing zone may be surrounded by a hot gas or steam.

In a typical operation according to the present invention a packer is arranged between the producing string and the casing at a point which is above the producing formation. A liquid silicone or a mixture of silicone and oil, pre-heated if desired, is passed downwardly through the tubing and sufficient pressure is applied to it to force it into any exposed formations which in the ordinary case will be the producing formation and possibly the next lower formation. Since the approximate volume of the cavity below the packer is known and the diameter of the tubing is fixed, a fair idea of the extent of penetration can be obtained by measuring the amount of fluid introduced. Sufficient fluid should steadily be forced into the formation to penetrate to a depth of from 5 to 10'. If desired, the charge of silicone or silicone and oil may be preceded by a charge of oil alone. Likewise, an initial flush with alcohol or a similar dehydrating fluid may be utilized. One of the advantages of the present invention is, however, that the dehydrating flush may ordinarily be dispensed with because, unlike coating agents which have previously been proposed, the silicone does not have a tendency to form a precipitate when brought into contact with water. The formation of such a precipitate militates against intrusion of the coating fluid into the formation.

The nature of the present invention may be more readily understood from the following detailed description of the accompanying drawing, in which:

Fig. 1 is a vertical section of a well illustrating a typical coning condition; and Fig. 2 is a similar view of the same well after treatment according to the present invention.

Referring to the drawing in detail, numeral 1 designates a bore hole provided with a casing 2, extending to the producing horizon 3, and backed up by the usual cement 4. Below the producing horizon is a formation 5, bearing salt water. The well is provided with a casing head 6, illustrated diagrammatically which supports a producing string of tubing 7, extending down to the producing formation and provided near its lower end with a packer 8, sealing the annular space between the tubing and the casing. It will be understood that the various items of equipment mentioned will be standard equipment possessing the well known structural details necessary for their functioning. These details are not illustrated because they have no bearing on the present invention.

In Fig. 1 the solid arrows show the direction of movement of oil while the dotted arrows show the direction of movement of water. The condition illustrated is one in which coning has reached a dangerous stage. It will be observed that the formation is producing water as well as oil.

In the practice of the present invention as illustrated in Fig. 2, a charge of oil is first forced down the tubing. This is followed by a charge of a liquid silicone or preferably a dilute solution of a silicone in oil. The arrows show the direction of movement of these fluids at the well bottom. It will be understood that there will be no clear line of demarcation between the charge of oil and the charge of silicone or silicone and oil as shown in the drawing since these liquids are miscible. For the purpose of illustration, however, the forward line of travel of the oil charge is indicated by line 9 while the forward line of travel of the silicone or silicone and oil charge is indicated by line 10.

In a preferred embodiment of the present invention the silicone-containing charge is heated to a temperature of at least about 500° F., the oil, if one be employed, having a suitable initial boiling point to permit this heating. In order to conserve the preheat it may be desirable to introduce into the annular space between the casing 2 and tubing 7, a heating fluid such as superheated steam or hot gas. This may be conveniently done by providing suitable conduits 11 for this purpose, a vent 12 being provided in the casing head to permit circulation of such heating medium. It is also contemplated that a combustible gas mixture may be introduced through conduits 11 and ignited at the lower end thereof so as to convert the aforesaid annular space into a furnace. It will be appreciated that, where heating means are to be employed, any substantial quantity of liquid which may have accumulated in said annular space is first pumped out.

A suitable treating mixture for use in accordance with the present invention is a 1% solution of an alkyl silicone having a viscosity of 2 centistokes in a crude oil which, in a particular treating composition employed, was a Pickens crude from the Pickens Field in Mississippi.

After the treating liquid has been injected into the producing and adjacent formations to approximately the extent indicated, the pressure at the surface is released and the well allowed to produce. To realize the full advantages of the present invention, some care should be exercised in adjusting the rate of production after treatment. It is usual to have data on the permeability of the producing formation. Experimental work has indicated that the pore radius in microns may be taken as being approximately the square root of the permeability in millidarcys. Having the pore radius, the capillary pressure may be estimated from the relation $P \times r = 2G$, where $P$ is the capillary pressure, i. e. the maximum pressure which the pore will withstand before permitting ingress of a non-wetting liquid, $r$ is the radius of the pore and $G$ is the interfacial tension between the wetting liquid and the non-wetting liquid, such as crude oil and water.

In actual practice the allowable production may be determined by trial and error starting with a fairly low production and increasing it until water begins to intrude into the well. Then the production can be cut down to a value sufficiently below that at which some water is produced. The provision of what amounts to a lining of silicone in the pores according to the present invention, since this lining is of a more or less permanent nature, will serve to cut off the flow of water even through it has started to pass through. In the event that water persists after it once starts flowing, a charge of oil may be forced back down through the formation to free the pores of water and fill them with oil.

The nature and objects of the present invention having been thus described and illustrated, what is claimed as new and useful and is desired to be secured by Letters Patent is:

1. A method for improving oil production from a subterranean formation penetrated by a bore hole which comprises forcing into the formation an oil containing in solution a small percentage of a liquid silicone polymer and preheated to a temperature of at least about 500° F.

2. A method for improving oil production from a subterranean formation penetrated by a bore hole which comprises establishing a conduit surrounded by a free annular space between the surface and the formation, preheating a liquid silicone polymer at the surface to a temperature of at least about 500° F., filling said annular space with a heating medium at a temperature of at least about 500° F. and forcing the silicone through said conduit into the producing formation.

3. A method according to claim 2 in which the silicone polymer is dissolved in a large quantity of oil.

4. A method for improving oil production from a subterranean formation penetrated by a bore hole which comprises forcing into the formation a liquid silicone polymer pre-heated to a temperature of at least about 500° F.

PHILIP S. WILLIAMS.
HENRY J. WELGE.

REFERENCES CITED

The following references are of record in the file of this patent:

UNITED STATES PATENTS

| Number | Name | Date |
|---|---|---|
| 48,994 | Parry | July 25, 1865 |
| 2,024,119 | Vietti et al. | Dec. 10, 1935 |
| 2,265,962 | Bent et al. | Dec. 9, 1941 |
| 2,306,222 | Patnode | Dec. 22, 1942 |
| 2,387,361 | Stephenson | Oct. 23, 1945 |

OTHER REFERENCES

"Organo-Silicon Compounds Emerge From Laboratory," Chemical Industries, vol. 55, pages 222 and 223, August 1944.

Rochow, E. G.: "The Organosilicon Polymers," Chemical and Engineering News, vol. 33, page 616, April 1945.

Rochow, E. G.: "Chemistry of the Silicones," page 70, John Wiley and Sons, Inc., New York, 1946.